United States Patent
Okamura (10) Patent No.: US 9,928,710 B2
(45) Date of Patent: Mar. 27, 2018

(54) DANGER ALERTING METHOD AND DEVICE, PORTABLE ELECTRONIC APPARATUS

(71) Applicant: BOE Technology Group Co., Ltd., Beijing (CN)

(72) Inventor: Masakazu Okamura, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 15 days.

(21) Appl. No.: 14/564,977

(22) Filed: Dec. 9, 2014

(65) Prior Publication Data
US 2016/0104367 A1 Apr. 14, 2016

(30) Foreign Application Priority Data
Oct. 14, 2014 (CN) .......................... 2014 1 0542281

(51) Int. Cl.
*G06K 7/06* (2006.01)
*G08B 21/02* (2006.01)
*H04M 1/725* (2006.01)

(52) U.S. Cl.
CPC ......... *G08B 21/02* (2013.01); *H04M 1/72538* (2013.01); *H04M 2250/52* (2013.01)

(58) Field of Classification Search
CPC ..... G08B 25/016; G08B 25/001; H04W 4/22; H04W 4/02; G01S 19/17
USPC ........................................................ 235/441
See application file for complete search history.

(56) References Cited

U.S. PATENT DOCUMENTS 5,552,772 A * 9/1996 Janky .................... G08B 3/1083
340/539.1
2009/0179752 A1* 7/2009 Patel ................. H04M 1/72572
340/539.13
2010/0229410 A1* 9/2010 Schubert .................. G01C 9/06
33/366.27

(Continued)

FOREIGN PATENT DOCUMENTS

CN 103092605 A 5/2013
CN 103106374 A 5/2013

(Continued)

OTHER PUBLICATIONS

Jan. 19, 2016—(CN) Office Action—App No. 201410542281.3.
(Continued)

*Primary Examiner* — Thien M Le
*Assistant Examiner* — Tae Kim
(74) *Attorney, Agent, or Firm* — Banner & Witcoff, Ltd.

(57) ABSTRACT

A danger alerting device, a danger alerting method for a portable electronic apparatus and a portable electronic apparatus are provided. The method includes: detecting whether a holder of the portable electronic apparatus is in a potential danger status; in case that the holder of the portable electronic apparatus is in the potential danger status, comparing a time duration data T for which the holder is in the potential danger status with a preset time duration data T0; and alerting the holder to danger in case that the time duration data T is greater than or equal to the preset time duration data T0. The danger alerting device and method can effectively prevent a holder from encountering danger while using a portable electronic apparatus during walking, and significantly reduce the probability of danger.

20 Claims, 7 Drawing Sheets

(56) References Cited

U.S. PATENT DOCUMENTS

| | | | | |
|---|---|---|---|---|
| 2010/0267361 A1* | 10/2010 | Sullivan | ............... | G01S 19/17 455/404.2 |
| 2013/0293586 A1* | 11/2013 | Kaino | ............... | G08G 1/005 345/633 |
| 2014/0066097 A1* | 3/2014 | Kolodziej | ............ | H04W 4/023 455/456.3 |
| 2014/0300739 A1* | 10/2014 | Mimar | ............... | H04N 7/188 348/148 |

FOREIGN PATENT DOCUMENTS

| | | |
|---|---|---|
| CN | 103578288 A | 2/2014 |
| CN | 103873689 A | 6/2014 |
| CN | 104008628 A | 8/2014 |

OTHER PUBLICATIONS

Apr. 8, 2016—(CN)—Second Office Action Appn No. 201410542281.3 with English Tran.

Mar. 21, 2017—(CN) Third Office Action Appn 201410542281.3 with English Tran.

Jun. 21, 2017—(CN) Office Action Appn 201410542281.3 with English Translation.

Jun. 21, 2017—(CN) Fourth Office Action Appn 201410542281.3 with English Tran.

\* cited by examiner

DANGER ALERTING METHOD AND DEVICE, PORTABLE ELECTRONIC APPARATUS

This application claims priority to Chinese Patent Application No. 201410542281.3, filed on Oct. 14, 2014. The present application claims priority to and the benefit of the above-identified application and is incorporated herein in its entirety.

TECHNICAL FIELD

Embodiments of the present disclosure relate to a danger alerting method and device for a portable electronic apparatus and a portable electronic apparatus.

BACKGROUND

With the development of electronic technologies, various portable electronic apparatuses, such as cellphones, palmtop game machines, e-books and tablet computers, have been more and more frequently used in people's daily life. In some situations, a holder who carries a portable electronic apparatus may use the portable electronic apparatus while walking, for example, sending a SMS message, playing a computer game or watching video with the portable electronic apparatus while walking. In such a situation, it is very likely that the holder contact and collide with objects or other people in surrounding environment, suffering from dangers. Therefore, it is desired to have a method and a device for alerting the holder to such dangers.

A number of methods and devices for alerting holders to dangers have been proposed. For example, a portable electronic apparatus take a picture of the circumstance right ahead the holder of portable electronic apparatus with a camera built in the portable electronic apparatus and then analyzes the taken circumstance picture with a face recognition unit. When finding a face in the taken circumstance picture, the holder is alerted to danger by the portable electronic apparatus.

SUMMARY

At least one embodiment of the present disclosure provides a danger alerting method for a portable electronic apparatus, including: detecting whether a holder of the portable electronic apparatus is in a potential danger status; in case that the holder of the portable electronic apparatus is in the potential danger status, comparing a time duration data T for which the holder is in the potential danger status with a preset time duration data T0; and alerting the holder to danger in case that the time duration data T is greater than or equal to the preset time duration data T0.

In one example, detecting whether the holder of the portable electronic apparatus is in the potential danger status comprises: detecting whether there is any application program running in the portable electronic apparatus; and detecting whether the portable electronic apparatus is in a moving status, in case that the portable electronic apparatus is in the moving status and there is an application program running in the portable electronic apparatus, determining that the portable electronic apparatus is in the potential danger status. In one example, detecting whether the holder of the portable electronic apparatus is in the potential danger status comprises: detecting whether there is any application program running in the portable electronic apparatus; detecting whether the portable electronic apparatus is in a moving status; obtaining a first image by capturing a front scene of the portable electronic apparatus; and recognizing whether there is any person face in the first image, in case that the portable electronic apparatus is in the moving status, there is an application program running in the portable electronic apparatus, and the first image contains a person face, determining that the holder is in the potential danger status.

In one example, detecting whether there is any application program running in the portable electronic apparatus comprises: detecting whether there is an image relating to an application displayed in a display screen of the portable electronic apparatus, or detecting whether there is any user operation on the portable electronic apparatus over a predetermined time period.

In one example, detecting whether the holder of the portable electronic apparatus is in the potential danger status comprises: determining whether the portable electronic apparatus is in the potential danger status based on a status determination signal manually input by the holder.

In one example, the above-mentioned method further includes: detecting whether the portable electronic apparatus is in an increased danger probability status after determining that the holder of the portable electronic apparatus is in the potential danger status and before comparing the time duration data T for which the holder is in the potential danger status with the preset time duration data T0.

In one example, the increased danger probability status includes: a status in which a travel speed of the portable electronic apparatus is greater than a predetermined value, a status in which an luminance of an environment where the portable electronic apparatus is located is less than a predetermined value, or a status in which the portable electronic apparatus is vertically or tilt held.

In one example, if the portable electronic apparatus is in the increased danger probability status, a value of T0 is reduced or the holder is alerted to danger.

In one example, the above-mentioned method further includes: obtaining a second image by capturing a rear scene of the portable electronic apparatus; implementing an image analysis processing on the second image and detecting whether the second image contains at least a part of the danger sign; and in case that it is determined that the holder of the portable electronic apparatus is in the potential danger status and the second image contains at least a part of the danger sign, alerting the holder to danger; otherwise, determining whether the time duration data T is greater than or equal to the preset time duration data T0, and if so, alerting the holder to danger.

Another embodiment of the present disclosure provides a danger alerting device for a portable electronic apparatus comprising a potential danger status detection section, a timing unit, a control section and a danger alerting unit, wherein, the potential danger status detection section is configured to detect whether the holder of the portable electronic apparatus is in a potential danger status; the timing unit is configured to count a time duration data T for which the holder is in the potential danger status; the control section is configured to determine whether the time duration data T is greater than or equal to a preset time duration data T0 and determine whether or not to implement danger alerting when the holder of the portable electronic apparatus is in the potential danger status; the danger alerting unit is configured to carry out a danger alerting operation.

In one example, the potential danger status detection section comprises a movement detection unit and an application program running detection unit; the movement detection unit is configured to detect whether the portable electronic apparatus is in a moving status; the application program running detection unit is configured to detect whether there is any application program in running status in the portable electronic apparatus, when the portable electronic apparatus is in the moving status and there is an application in running status in the portable electronic apparatus, it is determined that the holder is in the potential danger status.

In one example, the potential danger status detection section comprises a movement detection unit, an application program running detection unit, a first image acquiring unit and a face recognition processing unit, wherein the movement detection unit is configured to detect whether the portable electronic apparatus is in a moving status; the application program running detection unit is configured to detect whether there is any application program in running status in the portable electronic apparatus; the first image acquiring unit is configured to obtain a first image by capturing a front scene of the portable electronic apparatus; the face recognition processing unit is configured to recognize whether there is any person face in the first image, in case that the portable electronic apparatus is in the moving status, there is an application in running status in the portable electronic apparatus, and the first image contains a person face, it is determined that the holder of the portable electronic apparatus is in the potential danger status.

In one example, the application program running detection unit comprises an image display detection unit and a user operation detection unit, the image display detection unit is configured to detect whether there is any image relating to an application displayed in the portable electronic apparatus; the user operation detection unit is configured to detect whether there is any user operation on the portable electronic apparatus over a predetermined time period.

In one example, the potential danger status detection section comprises a manual input unit for the holder to manually input a status determination signal.

In one example, the above-mentioned danger alerting device further includes a second image acquiring unit and an image analysis processing unit, wherein the second image acquiring unit is configured to obtain a second image by capturing a rear scene of the portable electronic apparatus; the image analysis processing unit is configured to implement an image analysis processing on the second image and detect whether there is at least a part of a danger sign in the second image, the control section further comprises instructing the danger alerting unit to carry out a danger alerting operation in response to the second image containing at least a part of danger signs when the holder of the portable electronic apparatus is in the potential danger status.

In one example, the above-mentioned danger alerting device further includes: a danger probability detection unit for detecting whether the portable electronic apparatus is in an increased danger probability status; if the portable electronic apparatus is in the increased danger probability status, the control section reduces a value of T0 or alert the holder to danger.

Yet another embodiment of the present disclosure provides a portable electronic apparatus including any of the above-mentioned danger alerting devices. At least one embodiment of the present disclosure provides a danger alerting device, a danger alerting method for a portable electronic apparatus and a portable electronic apparatus that can effectively prevent a user from encountering a danger while he or she is using the portable electronic apparatus in motion such as walking, and significantly reduce the probability of danger.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Similarly, terms such as "one", "a" or "the" do not mean to limit quantity but represent the presence of at least one. The terms "comprise," "comprising," "include," "including," etc., are intended to specify that the elements or the objects stated before these terms encompass the elements or the objects and equivalents thereof listed after these terms, but do not preclude the other elements or objects.

For the conventional danger alerting method and device for a portable electronic apparatus, the inventor has found out the following problems. In general, when a holder holds a portable electronic apparatus and walks outdoors, the portable electronic apparatus generally forms an acute angle less than 90 degree with respect to the ground and is tilt toward the ground, therefore it is not easy for the built-in camera to directly capture an image of a face right ahead. Further, the people ahead may also have his/her back towards the holder, in which case even if the built-in camera captures an image of the back of the people ahead, the face recognition unit cannot recognize it as a pedestrian that could lead to collision, hence the risk of missing a danger alert exists. Furthermore, for a holder who is using a portable electronic apparatus while walking, dangers are not only from people ahead, but also from circumstance obstacles ahead, such as steps, pits, pools, trees or wire poles, which all may cause danger to the holder as well. Therefore, initiating danger alerting in the condition of recognizing a person face will significantly increase the probability of missing danger alert.

At least one embodiment of the present disclosure provides a danger alerting device, a danger alerting method for a portable electronic apparatus and a portable electronic apparatus that can effectively prevent a user from encountering a danger while he or she is using the portable electronic apparatus in motion such as walking, and can significantly reduce the probability of danger.

The portable electronic apparatus according to an embodiment of the present disclosure is a mobile electronic device easily portable, examples of which may include, but not limited to, video telephones, conventional functional phones such as personal telephones, smart telephones, personal digital assistants (PDAs), mobile multimedia players (PMPs), e-books, portable computers such as notebook computers, tablet computers, digital cameras and smart watches.

To keep the following description of embodiments of the present disclosure clear and brief, detail explanation of known functions and known parts may be omitted. When any part of an embodiment of the present disclosure exits in more than one accompanying drawings, the part is denoted with a same reference numeral in each drawing.

First Embodiment

Figure 1:
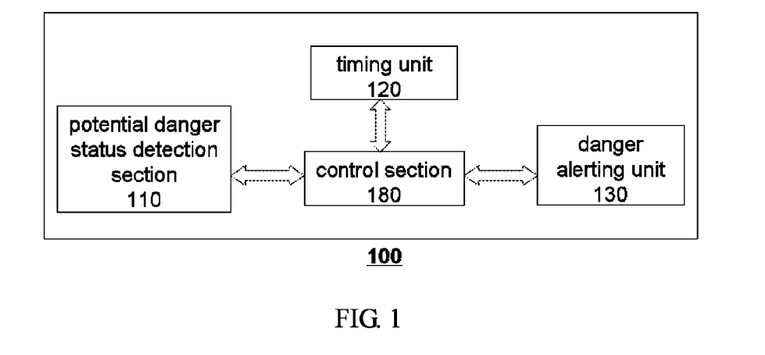
FIG. 1 shows a block diagram of a danger alerting device for a portable electronic apparatus according to a first embodiment of the present disclosure.
Figure 2:
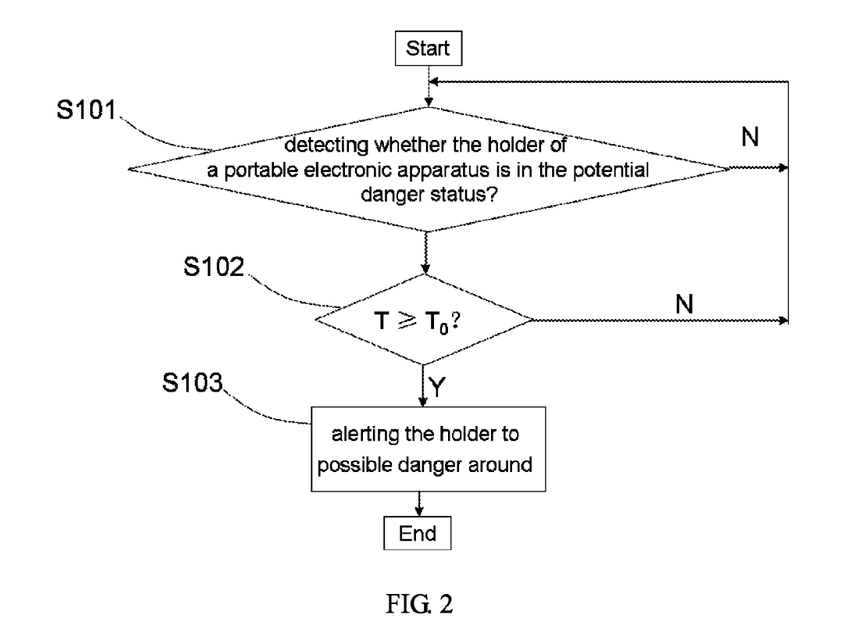
FIG. 2 shows a flow chart of a danger alerting method for a portable electronic apparatus according to the first embodiment of the present disclosure.

FIG. 1 shows a block diagram of a danger alerting device 100 for a portable electronic apparatus according to a first embodiment of the present disclosure. FIG. 2 shows a flow chart of a danger alerting method using the danger alerting device 100 according to the first embodiment of the present disclosure. Hereinafter, the danger alerting device provided in the first embodiment of the present application will be described with reference to FIG. 1 and FIG. 2.

The danger alerting device 100 of the embodiment includes a potential danger status detection section 110, a timing unit 120, a danger alerting unit 130 and a control section 180.

The potential danger status detection section 110 is configured to detect whether the holder of the portable electronic apparatus is in a potential danger status. In the present disclosure, a "potential danger status" may include the status in which the holder of portable electronic apparatus is using the portable electronic apparatus while moving. For example, when a holder of portable electronic apparatus has his or her visual attention at least partially occupied by the portable electronic apparatus while moving, the holder is in a potential danger status.

In one example, the potential danger status detection section 110 can automatically detect whether the holder of the portable electronic apparatus is in a potential danger status in real time.

For example, when the portable electronic apparatus is in an operating status, the potential danger status detection section 110 is an active status, it is determined whether the user of the portable electronic apparatus is in a potential danger status by detecting, for example, in real time working status (such as whether in a standby status or an operating status, or whether a background program or an application is running), position status (such as whether in a motion status, or in a horizontal, tilt or vertical status), and operating environment (such as strong or weak light) of the portable electronic apparatus. For example, the working status of the portable electronic apparatus may be obtained from the operating system of the portable electronic apparatus. For example, the position status and operating environment may be obtained by sensors provided in the portable electronic apparatus, and the sensors include, but not limited to, an acceleration sensor, a gravity sensor, a direction sensor, a gyroscope sensor, a light induction sensor, a range sensor and so on.

For example, when an application program is running in the portable electronic apparatus and at the same time the portable electronic apparatus is in a moving status, it is possible to determine that the user of the portable electronic apparatus is in the potential danger status or is at a larger probability of potential danger status. For example, if the portable electronic apparatus is also in a horizontal or tilted position, the probability of potential danger status increases further. For example, if the portable electronic apparatus is also in an environment of insufficient light, the probability of potential danger status increases further.

Figure 3A:
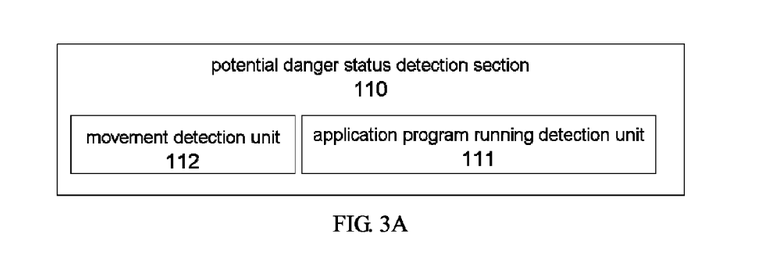
FIG. 3A shows a block diagram of a potential danger status detection section according to a first example.

In the first example, as shown in FIG. 3A, the potential danger status detection section 110 includes for example a movement detection unit 112 and an application program running detection unit 111, for detecting whether the holder of the portable electronic apparatus is in the potential danger status.

The application program running detection unit 111 is configured to detect whether there is any application program is running in the portable electronic apparatus and output an application program running acknowledgement signal. The application program running detection unit 111 may for example determine whether there is any application program running that can draw the holder's visual attention in the portable electronic apparatus by any one or combination of the following ways: (1) detecting whether there is any image (including a picture, a clip of video, an interactive interface) relating to an application that can for example draw the holder's visual attention displayed in the display screen of the portable electronic apparatus, and (2) detecting whether there is any user operation on the portable electronic apparatus over a predetermined time period, e.g., any keystroke or touch screen input operation within 30 seconds (especially operations that need highly the user's attention such as inputting text), and determining that there is any application that can draw the holder's visual attention is running in the portable electronic apparatus if there is any user's operation. The application program running detection unit 111 may for example be implemented in hardware and software to obtain respective status information from the operating system of the portable electronic apparatus. In one example, the application program running detection unit 111 includes an image display detection unit and a user operation detection unit for implementing the above-mentioned two functions respectively.

The movement detection unit 112 is configured to detect whether the portable electronic apparatus is in movement and output a movement status acknowledgement signal. There are a number of technical ways known for detecting whether the portable electronic apparatus is in a movement status, for example, a global position system (GPS) receiving device, an acceleration sensor or the like can be employed, detail description of which will be omitted here.

For example, the application program running detection unit 111 and the movement detection unit 112 can output the application program running acknowledgement signal and the movement status acknowledgement signal to the control section 180 respectively, and the control section 180 determines whether the holder of the portable electronic apparatus is in the potential danger status based on the received application program running acknowledgement signal and the movement status acknowledgement signal.

Alternatively, the application program running detection unit 111 may also output the application program running acknowledgement signal to the movement detection unit 112, and the movement detection unit 112, upon receiving the application program running acknowledgement signal indicating "there is an application program running", detects whether the portable electronic apparatus is in movement and outputs the movement status acknowledgement signal to the control section 180. In this case, the control section 180 can determine that the holder is in the potential danger status in case of receiving the movement status acknowledgement signal indicating "the portable electronic apparatus is moving" output by the movement detection unit 112. Correspondingly, the control section 180 can determine that the holder is not in the potential danger status in case of receiving the movement status acknowledgement signal indicating "the portable electronic apparatus is not moving" output by the movement detection unit 112.

Similarly, the movement detection unit 112 may also output the movement status acknowledgement signal to the application program running detection unit 111, the application program running detection unit 111, upon receiving the movement status acknowledgement signal indicating "the portable electronic apparatus is moving", detects whether there is any application program running in the portable electronic apparatus and outputs the application program running acknowledgement signal to the control section 180. In this case, the control section 180 can determine that the holder is in the potential danger status in case of receiving the application program running acknowledgement signal indicating "there is an application program running" output by the application program running detection unit 111. Correspondingly, the control section 180 can determine that the holder is not in the potential danger status in case of receiving the application program running acknowledgement signal indicating "there is no application program running" output by the application program running detection unit 111.

Figure 4A:
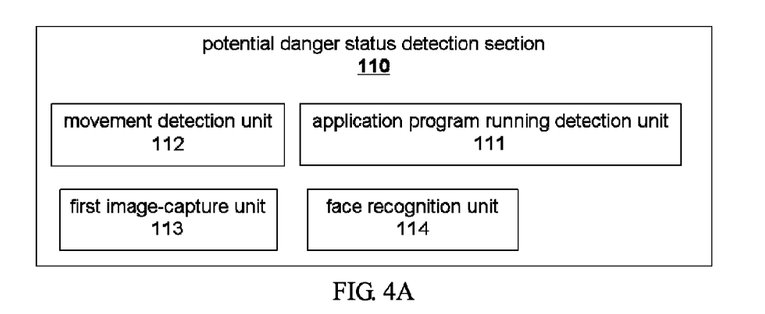
FIG. 4A shows a block diagram of a potential danger status detection section according to a second example.

In the third example, as shown in FIG. 4A, the potential danger status detection section 110 further includes, in addition to the movement detection unit 112 and the application program running detection unit 111, a first image-capture unit 113 and a face recognition unit 114 for detecting whether the holder of the portable electronic apparatus is in the potential danger status.

The first image-capture unit 113 may obtain a first image by capturing the front scene of the portable electronic apparatus (namely capturing images while facing the holder) automatically or based on an instruction from the control section 180. The face recognition unit 114 is configured to recognize whether there is any person face in the first image. In addition to the image capturing function, the first image-capture unit 113 may further have an image processing function to output image data required by the face recognition unit 114. The first image-capture unit 113 may be an image capturing unit comprising a CMOS (complementary metal oxide semiconductor) sensor, a CCD (charge coupled device) sensor, and so on. For example, the first image-capture unit 113 is disposed in the surface where the display screen of the portable electronic apparatus is located, e.g., being a front camera of the portable electronic apparatus.

For example, after it has been determined that the portable electronic apparatus is moving and there is an application program running therein, the control section 180 instructs the first image-capture unit 113 to capture the front scene of the portable electronic apparatus to obtain the first image and instructs the face recognition unit 114 to implement face recognition processing on the first image to detect whether the first image contains a person face. The face recognition processing technology is a well established technology at present, and detail description relating to the structure and the method of the face recognition unit is omitted here. If the face recognition unit 114 detects the first image contains a person face, the control section 180 instructs the danger alerting unit 130 to alert the holder to the danger around.

When at least part of the visual attention of the holder is occupied by the portable electronic apparatus, the face of the holder will be substantially directly opposite to the display part of the portable electronic apparatus. In such a case, the first image-capture unit 113 captures the first image that would contain the face image of the holder and the face recognition processing unit 114 can also recognize the face contained in the first image. Therefore, in the second example, because the result about whether the first image captured by the first image-capture unit contains a person face is one of the conditions for determining whether the holder is in the potential danger status, the accuracy of danger alerting may further improved.

Figure 5:
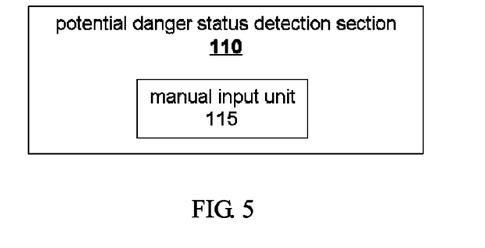
FIG. 5 shows a block diagram of a potential danger status detection section according to a third example.

In the fourth example, as shown in FIG. 5, the potential danger status detection section 110 may include a manual input unit 115. For example, the manual input unit 115 may include a key input unit, a touch input unit or a speech (voice) input unit. The holder can input a status determination signal into the control section 180 via the key input unit, the touch input unit or the speech input unit, and the control section 180 can directly determine whether the holder is in the potential danger status based on the status determination signal. For example, the holder can input a status determination signal of "entering the potential danger status" into the control section 180 via the key input unit, the touch input unit or the speech input unit, and then the control section 180 can determine the holder is in the potential danger status based on the status determination signal. The holder can input a status determination signal of "exiting the potential danger status" into the control section 180 via the key input unit, the touch input unit or the speech input unit, and then the control section 180 can determine that the holder is not in the potential danger status based on the status determination signal. According to the present example, the key input unit, the touch input unit and the speech input unit provide the function that allows the holder to manually enter or exit the potential danger status. In this way, the user can select not to trigger the danger alerting device in certain situation, for example, in which the portable electronic apparatus functions as part of sport auxiliary equipment, for which situation the portable electronic apparatus can both run an application program and be in the movement status at the same time.

The key input unit may for example include keys for inputting information, while the touch input unit may include function buttons or a touch pad for setting multiple functions. When the portable electronic apparatus for example uses a capacitive or resistive touch screen, it may only include a predetermined least number of keys such that the touch screen can replace partial key input functions of the key input unit.

Another example of the potential danger status detection section 110 may further includes a danger probability detection unit 116 (see FIG. 8) in addition to the movement detection unit 112 and the application program running detection unit 111 for detecting whether the portable electronic apparatus is in a risky status of increased probability of danger. According to specific applications, the danger probability detection unit 116 is for example a gravity sensor or a light sensor.

If the control section 180 determines that the potential danger status acknowledgement signal of "whether the holder is in potential danger status" is obtained based on the signal received from the potential danger status detection section 110, it can output a timing control signal such as a timing triggering signal, a timing stop signal and a zero clearing signal to the timing unit 120 based on the potential danger status acknowledgement signal. For example, the control section 180 assumes that "the holder is not in the potential danger status" by default initially. When the potential danger status acknowledgement signal obtained by the control section 180 becomes from "the holder is not in the potential danger status" to "the holder is in the potential danger status", the control section 180 outputs a timing triggering signal to the timing unit 120. When the potential danger status acknowledgement signal obtained by the control section 180 becomes from "the holder is in the potential danger status" to "the holder is not in the potential danger status", the control section 180 outputs a timing stop signal or a zero clearing signal to the timing unit 120.

The timing unit 120 conducts a timing operation on the time duration data T for which the holder is in the potential danger status according to the timing control signal received from the control section 181. The time duration data T for which the holder is in potential danger status may have an initial value of "0" for example. Once the timing unit 120 receives the timing trigger signal, it starts the timing operation and outputs the current time duration data T for which the holder is in potential danger status to the control section 180 in real time or upon request. Once the timing unit 120 receives the timing stop signal, it stops the timing operation and outputs the current time duration data T for which the holder is in potential danger status to the control section 180. After receiving the zero clearing signal, the timing unit 120 sets the time duration data T to "0" again and can further output the current time duration data for which the holder is in potential danger status "T=0" to the control section 180.

The control section 180 receives or request to return the time duration data signal T transmitted from the timing unit 120 in real time, compares the time duration data T and a predetermined duration data T0, and then determines whether to transmit a danger alerting implementation signal to the danger alerting unit 130 according to the comparison result. The preset time duration data T0 may be stored in the control section 180 or in a separately provided storage device in advance. The preset time duration data T0 may be preset by the holder in advance according to his or her current situation, or may be selected or set by the portable electronic apparatus according to the detected potential danger status. For example, in case that people and circumstance around the traveling route are simple and steady, T0 may be set to be long, for example, 1 minute, 3 minutes, 5 minutes or longer. In case that people and circumstance around the traveling route is complex and variable, e.g., on street or in a weak light environment, T0 may be set to be short, for example, 50 seconds, 35 seconds, 20 seconds or shorter.

The danger alerting unit 130 carries out the danger alerting operation according to the danger alerting implementation signal received from the control section 180. Danger alerting operations include outputting alerting tone, vibrating, lighting an indicator lamp, popping out a prompt box, stopping the application program, stopping display, which may also be used in any combination. The holder feeds back according to specific circumstances after receiving the danger alerting signals by changing or stopping the mode in which the portable electronic apparatus is used, such as stopping movement, stopping using the portable electronic apparatus, or the like.

In one example, the danger alerting unit 130 may output a zero clearing signal to the timing unit 120 after carrying out the danger alerting operation, to set the time duration data T of the timing unit 120 to "0" again.

In embodiments of the present disclosure, the control section 180 may be various devices with control function, such as a central processing unit (CPU), a programmable logic control part (PLC), a monolithic computer or the like. The potential danger status detection section 110 may include various sensors. The timing unit 120 may be for example a timer. According to the danger alerting method, the danger alerting unit 130 may be for example a speaker, a vibrator, a indicator light such as LED or a display screen.

As shown in FIG. 2, the danger alerting method according to the first embodiment of the present disclosure includes the following steps.

In step S101, detecting whether the holder of the portable electronic apparatus is in the potential danger status; if so, step S102 is executed; if not, step S101 is executed again.

For example, it is possible to detect whether the holder of the portable electronic apparatus is in a potential danger status by the potential danger status detection section 110.

In step S102, the time duration data T for which the holder is in the potential danger status is compared with the preset time duration data T0, if T≥T0, step S103 is executed, if not, step S101 is executed again.

In step S102, the current time duration data T for which the holder is in potential danger status may be obtained from the above-mentioned timing unit 120.

For example, when the holder is continuously in the potential danger status ever since he or she enters the potential danger status at a certain instant, the control section 180 persistently receive a signal indicating "the holder is in potential danger status" from the potential danger status detection section 110. Therefore, the timing unit 120 is in the timing operation status since receiving the timing trigger signal and increases the time duration data T constantly and sends the data to the control section 180.

In one example, the holder may be in the potential danger status discontinuously, for example, the holder may walk for a while and then stop for a while although he or she is using the portable electronic apparatus all the time. In this case, it is possible to process the discontinuous movement durations as a whole, that is, adding up the movement durations, or process the discontinuous movement durations separately, clearing the timing unit every time the holder stops the movement. For the previous mode, for example, every time the holder becomes from the stationary status to the moving status, the signal received by the control section 180 from the potential danger status detection section 110 becomes from "the holder is not in potential danger status" to "the holder is in potential danger status", and the control section 180 now sends a timing trigger signal to the timing unit 120 and the obtained duration data T starts to increase. Every time the holder becomes from moving status to stationary status, the signal received by the control section 180 from the potential danger status detection section 110 becomes from "the holder is in potential danger status" to "the holder is not in potential danger status", and the control section 180 now sends a timing stop signal to the timing unit 120 and the obtained duration data T stops increase. Therefore, the time duration data T obtained by the timing unit 120 corresponds to the total time duration in which the holder is the potential danger status of using portable electronic apparatus while moving at the same time.

In step S103, alerting the holder to possible danger around.

For example, the danger alerting unit 130 may alert the holder to possible danger around or to avoid danger with sound, vibration or display of a warning picture in the display area of the portable electronic apparatus.

Figure 3B:
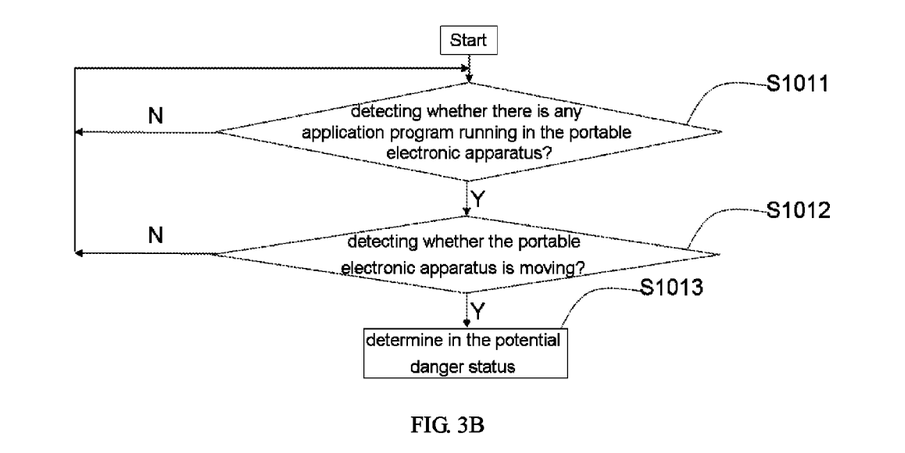
FIG. 3B shows a flow chart of step S101 in FIG. 2 according to the first example.

One example of detecting whether the holder of portable electronic apparatus is in the potential danger status in step S101 is shown in FIG. 3B, which corresponds to the device shown in FIG. 3A and includes the following steps.

In step S1011, detecting whether there is any application program running in the portable electronic apparatus, if so, step S1012 is executed, if not, step S1011 is executed again.

For example, the application program running detection unit 111 may be used to detect whether there is any application program running in the portable electronic apparatus.

In step S1012, detecting whether the portable electronic apparatus is moving; if so, step S1013 is executed to determine that the portable electronic apparatus is in the potential danger status; if not, step S1011 is executed again.

For example, the movement detection unit 112 may be used to detect whether the portable electronic apparatus is moving.

Figure 4B:
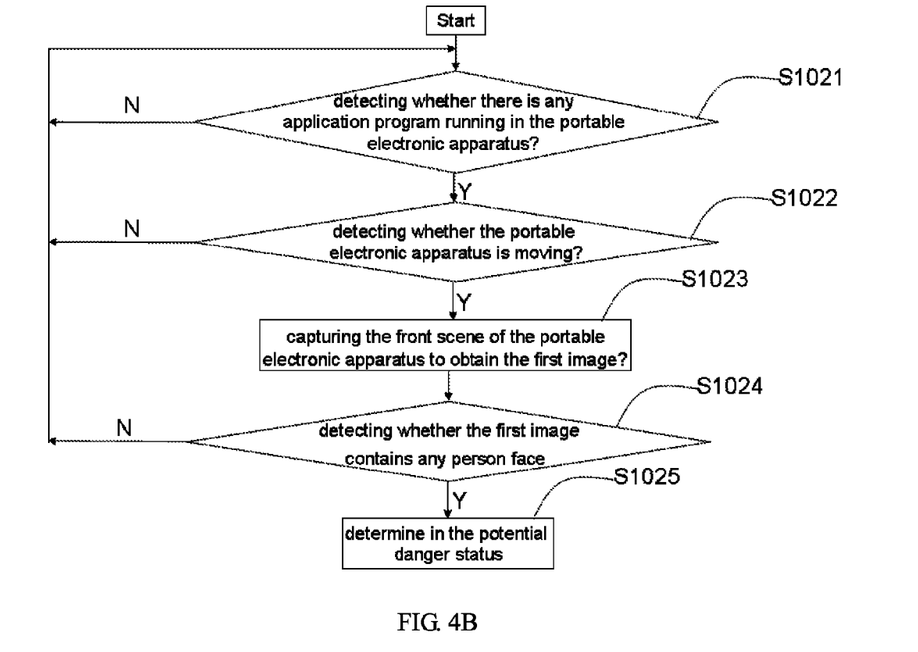
FIG. 4B shows a flow chart of step S101 in FIG. 2 according to the second example.

Another example of detecting whether the holder of portable electronic apparatus is in the potential danger status in step S101 is shown in FIG. 4A, which corresponds to the flow shown in FIG. 4B and includes the following steps.

In step S1021, detecting whether there is any application program running in the portable electronic apparatus, if so, step S1022 is executed, if not, step S1021 is executed again.

For example, the application program running detection unit 111 may be used to detect whether there is any application program running in the portable electronic apparatus.

In step S1022, detecting whether the portable electronic apparatus is moving, if so, step S1023 is executed, if not, step S1021 is executed again.

For example, the movement detection unit 112 may be used to detect whether the portable electronic apparatus is moving.

In step S1023: capturing (shooting) the front scene of the portable electronic apparatus to obtain the first image.

In step S1024, detecting whether the first image contains any person face; if so, step S1025 is executed to determine that the portable electronic apparatus is in the potential danger status; if not, step S1021 is executed again.

In the above examples, it is first detected whether there is any application program running in the portable electronic apparatus and then detected whether the portable electronic apparatus is moving. However, embodiments of the present disclosure are not limited thereto, and the order of these two steps can be exchanged. The approach of detecting whether the holder of the portable electronic apparatus is in the potential danger status in step S101 is not limited to the above-mentioned examples.

In the danger alerting device and method for an portable electronic apparatus according to the first embodiment of the present disclosure, whether or not to initiate danger alerting is independent of the specific circumstances of surrounding environment and people for the holder but is determined by detecting whether the time duration for which the holder is in potential danger status exceeds a preset time duration, thereby avoid danger to the most extent.

Second Embodiment

Figure 6:
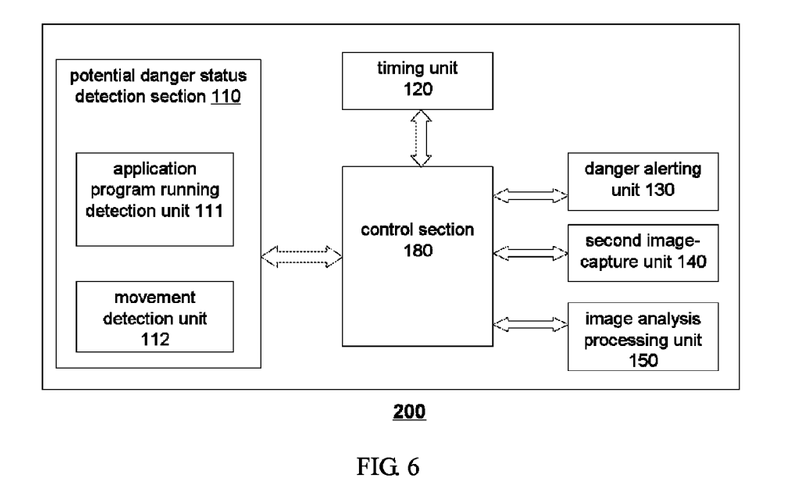
FIG. 6 shows a block diagram of a danger alerting device for a portable electronic apparatus according to a second embodiment of the present disclosure.
Figure 7:
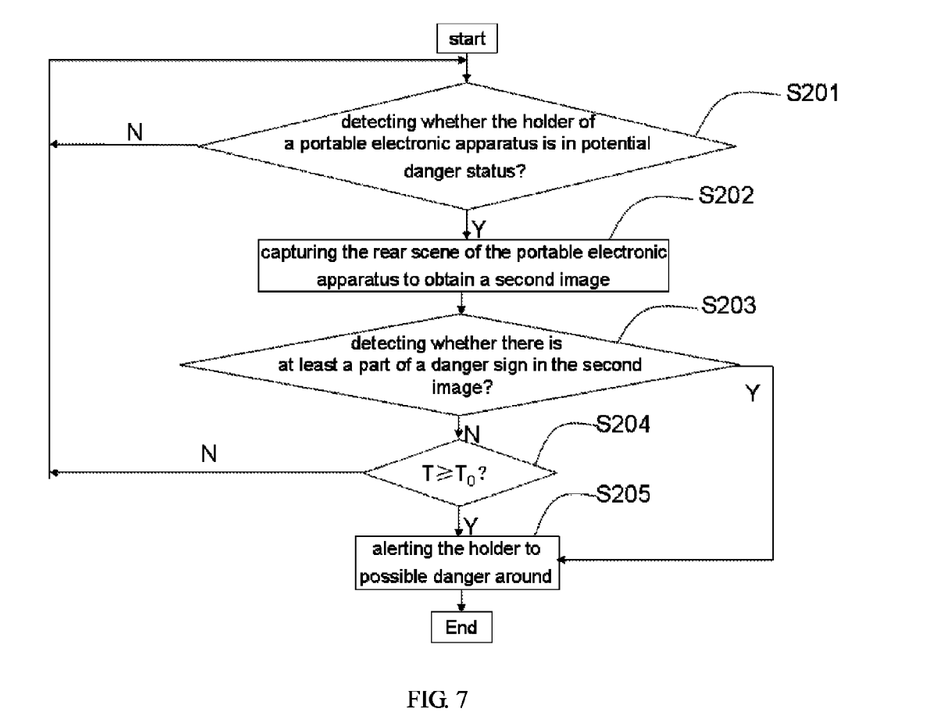
FIG. 7 shows a flow chart of a danger alerting method for a portable electronic apparatus according to the second embodiment of the present disclosure.

FIG. 6 shows a block diagram of a danger alerting device 200 for a portable electronic apparatus according to a second embodiment of the present disclosure. FIG. 7 shows a flow chart of the danger alerting method according to the second embodiment of the present disclosure. Hereinafter, the danger alerting device and method provided in the second embodiment of the present application will be described with reference to FIGS. 6 and 7.

The danger alerting device 200 according to the second embodiment is different from the danger alerting device 100 according to the first embodiment in that the danger alerting device 200 according to the second embodiment further includes a second image-capture unit 140 and an image analysis processing unit 150.

The second image-capture unit 140 is configured to obtain a second image by capturing the rear scene of the portable electronic apparatus. The second image-capture unit 140 may have a digital to analog (D/A) conversion function and an image processing function for outputting image data required by the image analysis processing unit 150. The second image-capture unit 140 may be an image capturing unit including a CMOS (complementary metal oxide semiconductor) sensor, a CCD (charge coupled device) sensor or the like. The second image-capture unit 140 is disposed in the surface opposite to the display screen of the portable electronic apparatus, e.g., it is a rear camera of the portable electronic apparatus. The image analysis processing unit 150 can be implemented for example by image analysis methods and respective devices known, which will not be described in detail here.

It is noted that "front" and "rear" are used herein for the portable electronic apparatus relative to the user, with a side of the portable electronic apparatus that faces the user being "front" and a side opposite to the user being "rear".

The image analysis processing unit 150 is configured to implement an image analysis processing on the second image and detect whether there is at least a part of a danger sign in the second image. Danger signs include, but not limited to, pedestrians, vehicles, trunks, upright posts, steps, pits, straight walls and so on. In one example, the image analysis processing unit 150 may be the same part as the aforementioned face recognition unit 114.

In case it is determined the holder of portable electronic apparatus is in the potential danger status, the control section 180 further instructs the second image-capture unit 140 to capture the rear scene of the portable electronic apparatus to obtain the second image and instructs the image analysis processing unit 150 to implement the image analysis processing on the second image and detect whether there is at least a part of a danger sign in the second image. For example, it is understood that the second image-capture unit 140 may be in the capturing status all the time and that the second image after the instant of potential danger status is called for a matching analysis in case that the holder of portable electronic apparatus is in the potential danger status. In case that the image analysis processing unit 150 detects at least a part of the danger sign is contained in the second image, the control section 180 instructs the danger alerting unit 130 to alert the holder to surrounding dangers, even if the current time duration data T of being in potential danger status is smaller than the preset time duration data T0. Otherwise, the control section 180 further determines whether the time duration data T of being in potential danger status is greater than or equal to the preset time duration data T0 and executes subsequent operations accordingly.

In the second embodiment, for example, the potential danger status detection section 110 according to the above mentioned second example is used as the potential danger status detection section 110.

As shown in FIG. 4B, the danger alerting method according to the second embodiment of the present disclosure includes the following steps.

In step S201, detecting whether the holder of the portable electronic apparatus is in the potential danger status; if so, step S202 is executed; if not, step S201 is executed again.

For example, the potential danger status detection section 110 may be used to detect whether the portable electronic apparatus is in the potential danger status. Step S201 is the same as step S101 in FIG. 2.

In step S202, capturing (shooting) the rear scene of the portable electronic apparatus to obtain the second image and step S203 is executed.

For example, the second image-capture unit 140 may be used to capture the rear scene of the portable electronic apparatus to obtain the second image.

In step S203, detecting whether there is at least a part of a danger sign in the second image, if so, step S205 is executed, and otherwise step S204 is executed.

Here, the danger sign may include person face, foot, wall, stairway, ditch, or the like obstacle.

In step S204, the current time duration data T for which the holder is in the potential danger status is compared with the preset time duration data T0, if T≥T0, step S205 is executed, if not, step S201 is executed again.

In step S205, alerting the holder to possible danger around.

For example, the danger alerting unit 130 may alert the holder to possible danger around by sound, vibration or display of warning picture in the display area of the portable electronic apparatus.

In the danger alerting device and method for a portable electronic apparatus according to the second embodiment of the present disclosure, whether or not to initiate danger alert is determined by combining two conditions: "whether the time duration for which the holder is in potential danger status exceeds a preset time duration", and "whether the second image-capture unit captures a danger sign", which avoids missing alert of surrounding dangers on the one hand and improves timeliness and accuracy of danger alert on the other hand.

In some embodiments of the present disclosure, the second image-capture unit and the first image-capture unit may be the same image-capture unit.

Third Embodiment

Figure 8:
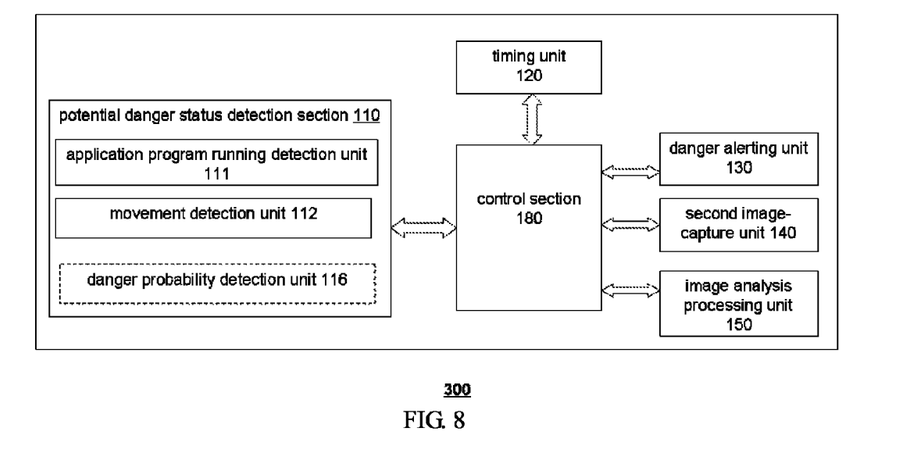
FIG. 8 shows a block diagram of a danger alerting device for a portable electronic apparatus according to a third embodiment of the present disclosure.
Figure 9:
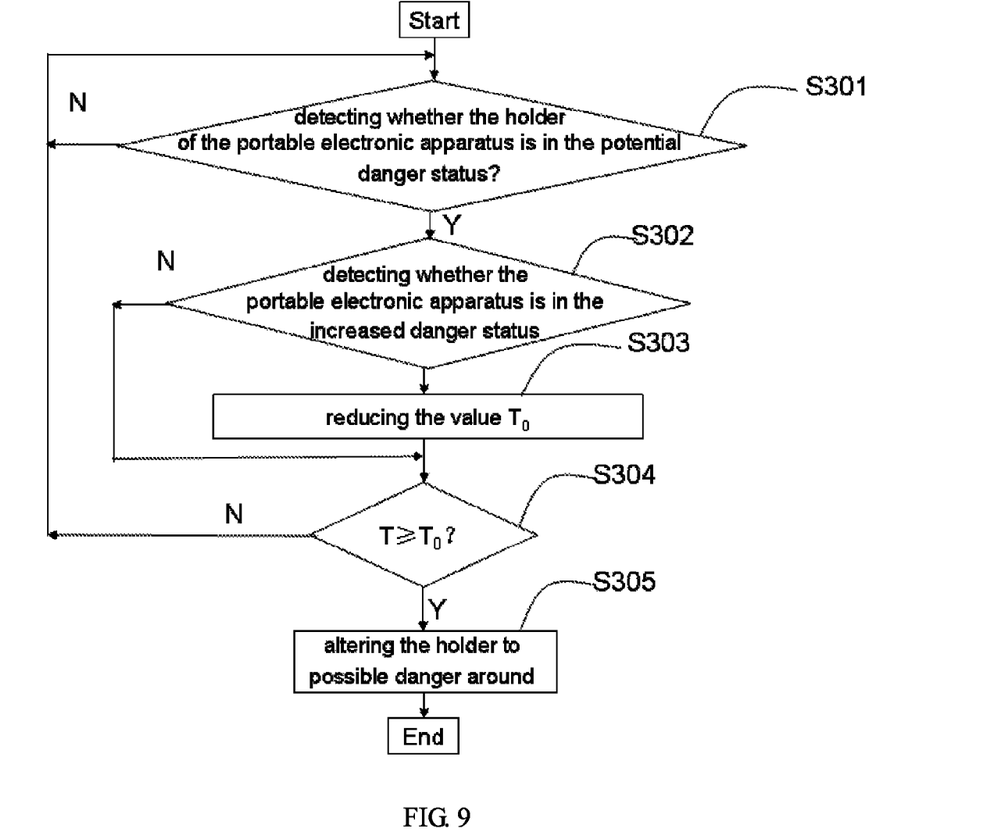
FIG. 9 shows a flow chart of a danger alerting method for a portable electronic apparatus according to the third embodiment of the present disclosure.

FIG. 8 shows a block diagram of a danger alerting device 300 for a portable electronic apparatus according to a third embodiment of the present disclosure. FIG. 9 shows a flow chart of a danger alerting method for a portable electronic apparatus according to a third embodiment of the present disclosure. Hereinafter, the danger alerting device and method provided in the third embodiment of the present application will be described with reference to FIGS. 8 and 9.

The danger alerting device 300 according to the third embodiment is different from the danger alerting device 100 according to the first embodiment in that: the danger alerting device 300 according to the third embodiment may further include a danger probability detection unit 116. If it is determined that the portable electronic apparatus is moving and there is an application program running therein, the control section 180 may further determine whether the portable electronic apparatus is in an increased danger probability status, that is, in an increased danger status.

Examples of increased danger statuses include: the portable electronic apparatus is in a high speed movement status, in a darker light environment, in a vertical or tilt held status. For example, if the travel speed V of the portable electronic apparatus is greater than a preset speed V0, or the portable electronic apparatus is in an environment with luminance F less than a preset luminance F0, or the portable electronic apparatus is vertically or tilted held, it is determined that the portable electronic apparatus is in an increased danger status and a corresponding processing is carried out, for example, directly sending a danger alert or reducing the preset time duration data T0.

Here, the travel speed V of the portable electronic apparatus may be detected by the movement detection unit 112 and transmitted to the control section 180. In one example, the predetermined value V0 corresponds to the slow walking speed of the holder, such as 1 m/s or 0.5 m/s. When the travel speed V of the portable electronic apparatus is greater than the predetermined value V0, the probability that the holder of the portable electronic apparatus is in danger is greater.

The luminance F of the environment where the portable electronic apparatus is located may be detected by a light induction sensor and transmitted to the control section 180. Here the light induction sensor is an example of the danger probability detection unit 116. For example, the predetermined value luminance F0 corresponds to the sunset outdoor luminance, e.g., 50 lux (lx), 30 lx or 20 lx. When the luminance F of the environment where the portable electronic apparatus is located is less than the predetermined luminance value F0, the probability that the holder of portable electronic apparatus is in danger is greater, or in other words, the probability that the holder is in the potential danger status become greater. Therefore, when the control section 180 further determines that "the travel speed V of the portable electronic apparatus is greater than V0" and/or "the luminance F of the environment where the portable electronic apparatus is located is less than F0", the control section 180 may modify the original set preset time duration data T0 to a smaller value, for example, reducing T0 from 1 minute to 30 seconds, thereby alerting the holder to existing danger in the circumstance in a shorter time duration.

Whether the holding status of the portable electronic apparatus is in a vertical or tilt position can be detected by a gravity sensor, and the gravity sensor is one example of the danger probability detection unit 116 now. When the holding status of the portable electronic apparatus is in a vertical or tilt position, the holder's sight line will be blocked by the portable apparatus, and at the same time the visual attention may focus on the portable electronic apparatus, hence a greater probability of danger for the holder exits.

As shown in FIG. 9, the danger alerting method according to the third embodiment of the present disclosure includes the following steps.

In step S301, detecting whether the holder of the portable electronic apparatus is in the potential danger status; if so, step S302 is executed; if not, step S301 is executed again. Step S201 is the same as step S101 in FIG. 2.

In step S302, detecting whether the portable electronic apparatus is in the increased danger status; if so, step S303 is executed; if not, step S304 is executed.

In step S303, reducing the value T0, and then step S304 is executed.

For example, the value of T0 may be reduced by a fixed value, for example, reducing 1 minute by 15 seconds to 45 seconds, or may be reduced by a certain ratio, for example, reducing 1 minute by 20% to 48 seconds.

In step S304, the time duration data T for which the holder is in the potential danger status is compared with the preset time duration data T0, if T≥T0, step S305 is executed, if not, step S301 is executed again.

In step S305, altering the holder to possible danger around.

For example, the danger alerting unit 130 may alert the holder to possible danger around by sound, vibration or display of a warning picture in the display area of the portable electronic apparatus.

In the danger alerting device and method for a portable electronic apparatus according to the third embodiment of the present disclosure, the preset time duration data T0 for initiating danger alerting is adjusted according to the probability of danger in the circumstance where the holder is located, which can further improve the flexibility and accuracy of danger alerting. Of course, when determining that the holder is in an increased danger status or continuously in the increased danger status, the holder may be alerted to the danger directly without modifying the preset time duration data T0, or the preset time duration data T0 may be modified to 0 to alert the holder to danger.

Those skilled in the art can understand that the above-mentioned embodiments can be combined with each other to obtain a new method. For example, in the method shown in FIG. 7, a step of detecting whether the portable electronic apparatus is in an increased danger status (namely steps S302 and S303 in FIG. 9) may be added between steps S203 and S204. Further alternatively, in the method shown in FIG. 9, a step of capturing the second image and detecting whether the second image contains a danger sign (namely steps S202 and S203 in FIG. 7) may be added between steps S303 and S304.

Those skilled in the art can clearly understand that the present disclosure may be implemented by software, firmware plus necessary general purpose hardware. Of course, it can be implemented by dedicated hardware. However in many cases, the former may be preferable implementations. Based on such an understanding, the technical proposal of the present disclosure is essentially embodied in software, hardware, firmware or any combination thereof. The computer software product is stored in a readable storage medium such as magnetic storage medium (e.g., hard disk) or electronic storage medium (e.g., ROM, flash memory) and includes a number of instructions for causing a computing device which may be a computer, a server or a network equipment, to carry out the method described in embodiments of the present disclosure.

What are described above is related to the illustrative embodiments of the disclosure only and not limitative to the scope of the disclosure; the scopes of the disclosure are defined by the accompanying claims.

The embodiment of the disclosure being thus described, it will be obvious that the same may be varied in many ways. Such variations are not to be regarded as a departure from the spirit and scope of the disclosure, and all such modifications as would be obvious to those skilled in the art are intended to be included within the scope of the following claims.

What is claimed is:

1. A danger alerting method for a portable electronic apparatus, comprising:
    detecting whether a holder of the portable electronic apparatus is in a potential danger status;
    in a case that the holder of the portable electronic apparatus is detected to be in the potential danger status, counting a time duration data T for which the holder is in the potential danger status, wherein the time duration data T corresponds to a sum of at least two discontinuous movement durations in which the holder is in the potential danger status with movement, and the at least two discontinuous movement durations are separated by a stationary duration in which the holder is detected to be in a stationary status;
    detecting whether the portable electronic apparatus is in an increased danger probability status, the increased danger probability status comprising a status in which a travel speed of the portable electronic apparatus is greater than a predetermined value and a status in which the portable electronic apparatus is vertically or tilt held;
    in response to detecting that the travel speed of the portable electronic apparatus is greater than the predetermined value and the portable electronic apparatus is vertically or tilt held, reducing a value of a preset time duration data T0;
    comparing the time duration data T for which the holder is in the potential danger status with the preset time duration data T0; and
    alerting the holder to danger in a case that the time duration data T is greater than or equal to the preset time duration data T0.

2. The method according to claim 1, wherein the detecting whether the holder of the portable electronic apparatus is in the potential danger status comprises:
    detecting whether there is any application program running in the portable electronic apparatus; and
    detecting whether the portable electronic apparatus is in a moving status,
    in a case that the portable electronic apparatus is detected to be in the moving status and there is an application program running in the portable electronic apparatus, determining that the portable electronic apparatus is in the potential danger status.

3. The method according to claim 2, wherein the detecting whether there is any application program running in the portable electronic apparatus comprises:
   detecting whether there is an image relating to an application displayed in a display screen of the portable electronic apparatus, or detecting whether there is any user operation on the portable electronic apparatus over a predetermined time period.

4. The method according to claim 1, wherein the detecting whether the holder of the portable electronic apparatus is in the potential danger status comprises:
   detecting whether there is any application program running in the portable electronic apparatus;
   detecting whether the portable electronic apparatus is in a moving status;
   obtaining a first image by capturing a front scene of the portable electronic apparatus; and
   recognizing whether there is a human face in the first image,
   in a case that the portable electronic apparatus is detected to be in the moving status, there is an application program running in the portable electronic apparatus, and the first image contains a human face, determining that the holder is in the potential danger status.

5. The method according to claim 4, wherein the detecting whether there is any application program running in the portable electronic apparatus comprises:
   detecting whether there is an image relating to an application displayed in a display screen of the portable electronic apparatus, or detecting whether there is any user operation on the portable electronic apparatus over a predetermined time period.

6. The method according to claim 1, wherein the detecting whether the holder of the portable electronic apparatus is in the potential danger status comprises:
   determining whether the portable electronic apparatus is in the potential danger status based on a status determination signal manually input by the holder.

7. The method according to claim 1, wherein the increased danger probability status comprises: a status in which a luminance of an environment where the portable electronic apparatus is located is less than a predetermined value.

8. The method according to claim 1, further comprising: alerting the holder to danger when the portable electronic apparatus is in the increased danger probability status.

9. The method according to claim 1, further comprising:
   obtaining a second image by capturing a rear scene of the portable electronic apparatus;
   implementing an image analysis processing on the second image and detecting whether the second image contains at least a part of a danger sign;
   in a case that it is determined that the holder of the portable electronic apparatus is in the potential danger status and the second image contains at least a part of the danger sign, alerting the holder to danger; and
   in a case that it is determined that the holder of the portable electronic apparatus is not in the potential danger status or the second image does not contain at least a part of the danger sign, determining whether the time duration data T is greater than or equal to the preset time duration data T0, and if so, alerting the holder to danger.

10. The method according to claim 1, wherein:
    counting the time duration data T for which the holder is in the potential danger status comprises:
    in response to a status of the holder of the portable electronic apparatus changing from being not in the potential danger status to being in the potential danger status, increasing the time duration data T;
    in response to the status of the holder of the portable electronic apparatus changing from being in the potential danger status to being not in the potential danger status, stopping the increasing of the time duration data T; and
    in response to the status of the holder of the portable electronic apparatus is changed from being not in the potential danger status to being in the potential danger status again, continuing to increase the time duration data T.

11. A danger alerting device for a portable electronic apparatus comprising:
    a potential danger status detection section;
    a danger probability detection unit;
    a timing unit;
    a control section; and
    a danger alerting unit, wherein,
    the potential danger status detection section is configured to detect whether a holder of the portable electronic apparatus is in a potential danger status,
    the danger probability detection unit is configured to detect whether the portable electronic apparatus is in an increased danger probability status, and the increased danger probability status comprises a status in which the portable electronic apparatus has a travel speed greater than a predetermined value and a status in which the portable electronic apparatus is vertically or tilt held,
    the timing unit is configured to count a time duration data T for which the holder is in the potential danger status, with the time duration data T corresponding to a sum of at least two discontinuous movement durations in which the holder is in the potential danger status with movement, and the at least two discontinuous movement durations being separated by a stationary duration in which the holder is detected to be in a stationary status,
    the control section is configured to:
       in response to detecting that the travel speed of the portable electronic apparatus is greater than the predetermined value and the portable electronic apparatus is vertically or tilt held, reduce a value of a preset time duration data T0; and
       determine whether the time duration data T is greater than or equal to the preset time duration data T0 and determine whether or not to implement danger alerting when the holder of the portable electronic apparatus is in the potential danger status, and
    the danger alerting unit is configured to carry out a danger alerting operation.

12. The danger alerting device according to claim 11, wherein the potential danger status detection section comprises a movement detection unit and an application program running detection unit;
    the movement detection unit is configured to detect whether the portable electronic apparatus is in a moving status; and
    the application program running detection unit is configured to detect whether there is any application program in running status in the portable electronic apparatus,
    in a case that the portable electronic apparatus is detected to be in the moving status and there is an application program in running status in the portable electronic apparatus, the holder is determined to be in the potential danger status.

13. The danger alerting device according to claim 12, wherein the application program running detection unit comprises an image display detection unit and a user operation detection unit;
the image display detection unit is configured to detect whether there is any image relating to an application displayed in the portable electronic apparatus; and
the user operation detection unit is configured to detect whether there is any user operation on the portable electronic apparatus over a predetermined time period.

14. The danger alerting device according to claim 11, wherein the potential danger status detection section comprises:
a movement detection unit,
an application program running detection unit,
a first image acquiring unit, and
a face recognition processing unit,
the movement detection unit is configured to detect whether the portable electronic apparatus is in a moving status,
the application program running detection unit is configured to detect whether there is any application program in running status in the portable electronic apparatus,
the first image acquiring unit is configured to obtain a first image by capturing a front scene of the portable electronic apparatus,
the face recognition processing unit is configured to recognize whether there is a human face in the first image, and
in a case that the portable electronic apparatus is detected to be in the moving status, there is an application program in running status in the portable electronic apparatus, and the first image contains a human face, it is determined that the holder of the portable electronic apparatus is in the potential danger status.

15. The danger alerting device according to claim 14, wherein the application program running detection unit comprises an image display detection unit and a user operation detection unit;
the image display detection unit is configured to detect whether there is any image relating to an application displayed in the portable electronic apparatus; and
the user operation detection unit is configured to detect whether there is any user operation on the portable electronic apparatus over a predetermined time period.

16. The danger alerting device according to claim 11, wherein the potential danger status detection section comprises a manual input unit for the holder to manually input a status determination signal.

17. The danger alerting device of claim 11, further comprising a second image acquiring unit and an image analysis processing unit, wherein,
the second image acquiring unit is configured to obtain a second image by capturing a rear scene of the portable electronic apparatus;
the image analysis processing unit is configured to implement an image analysis processing on the second image and detect whether there is at least a part of a danger sign in the second image; and
the control section is further configured to instruct the danger alerting unit to carry out a danger alerting operation in response to the second image containing at least a part of danger signs when the holder of the portable electronic apparatus is in the potential danger status.

18. The danger alerting device of claim 11,
wherein, if the portable electronic apparatus is in the increased danger probability status, the control section alerts the holder to danger.

19. The danger alerting device according to claim 18, wherein the increased danger probability status comprises: a status in which a luminance of an environment where the portable electronic apparatus is in is less than a predetermined value.

20. A portable electronic apparatus comprising the danger alerting device according to claim 11.

* * * * *